(12) United States Patent
Lee

(10) Patent No.: US 7,525,609 B2
(45) Date of Patent: Apr. 28, 2009

(54) LCD MODULE HAVING INVERTER POWER SUPPLY WITH MASTER/SLAVE PORTIONS INTERCONNECTED BY FLEXIBLE FLAT CABLE MOUNTED ON INNER SURFACE OF LOWER COVER AND WHERE MASTER/SLAVE PORTIONS AND CORRESPONDING SIDES OF POWER SUPPLY LINE ARE EXPOSED ON OUTER SURFACE OF LOWER COVER

(75) Inventor: Jong-Kook Lee, Gyeongsangbuk-Do (KR)

(73) Assignee: LG. Display Co., Ltd., Seoul (KR)

( * ) Notice: Subject to any disclaimer, the term of this patent is extended or adjusted under 35 U.S.C. 154(b) by 451 days.

(21) Appl. No.: 11/302,922

(22) Filed: Dec. 14, 2005

(65) Prior Publication Data

US 2006/0227258 A1 Oct. 12, 2006

(30) Foreign Application Priority Data

Apr. 7, 2005 (KR) ...................... 10-2005-0029143

(51) Int. Cl.
*G02F 1/1333* (2006.01)
(52) U.S. Cl. ........................................................ 349/58
(58) Field of Classification Search .............. 349/58–60
See application file for complete search history.

(56) References Cited

U.S. PATENT DOCUMENTS 6,501,642 B2 * 12/2002 Kim ........................... 361/681
6,587,166 B1 * 7/2003 Lee et al. ...................... 349/58
6,639,636 B2 * 10/2003 Yoo et al. ...................... 349/61

* cited by examiner

*Primary Examiner*—David Nelms
*Assistant Examiner*—John Heyman
(74) *Attorney, Agent, or Firm*—Brinks Hofer Gilson & Lione

(57) ABSTRACT

A liquid crystal display module includes a liquid crystal display panel (LCDP), a lamp supplying light to the LCDP; an inverter including master and slave portions connected with opposing sides of the lamp and supplying a drive voltage to the lamp; a flexible flat cable (FFC) connecting the master and slave portions; an optical sheet provided between the LCDP and the lamp that enhances efficiency of light supplied to the LCDP; a main support on which the LCDP, the lamp and the optical sheet are mounted; a top case pressing the entire upper edge of the LCDP to fix the LCDP to the main support; and a lower cover coupled with the top case to support the LCDP, the lamp and the optical sheet. The lower cover has a mounting part provided at an inner side thereof, on which the FFC is mounted.

21 Claims, 5 Drawing Sheets

LOOSE PORTION

LCD MODULE HAVING INVERTER POWER SUPPLY WITH MASTER/SLAVE PORTIONS INTERCONNECTED BY FLEXIBLE FLAT CABLE MOUNTED ON INNER SURFACE OF LOWER COVER AND WHERE MASTER/SLAVE PORTIONS AND CORRESPONDING SIDES OF POWER SUPPLY LINE ARE EXPOSED ON OUTER SURFACE OF LOWER COVER

PRIORITY CLAIM

This application claims the benefit of the Korean Patent Application 29143/2005, filed on Apr. 7, 2005, which is hereby incorporated by reference as if fully set forth herein.

TECHNICAL FIELD

The present disclosure relates to a liquid crystal display module and, more particularly, to an LCD module capable of preventing damage to a flexible flat cable (FFC) connected to an inverter that supplies a voltage to a lamp.

BACKGROUND

In general, an LCD device includes a liquid crystal display panel consisting of a thin film transistor (TFT) substrate and a color filter substrate which are attached with a certain interval therebetween so as to face each other and a liquid crystal layer provided between the TFT and color filter substrates, a driving unit for driving the liquid crystal display panel, and a backlight unit for supplying light to the liquid crystal display panel.

The TFT array substrate includes a plurality of data lines vertically arranged with a certain interval therebetween, a plurality of gate lines horizontally arranged with a certain interval therebetween, and a pixel defined at each crossing of the data line and the gate line and formed in a matrix form.

The color filter substrate includes a red, green and blue color filter layer formed at positions corresponding to the pixels and a black matrix for preventing leakage of light between the color filters and color interference of light passing through the pixels.

A common electrode and a pixel electrode face inner surfaces of the color filter substrate and the TFT array substrate, respectively, and apply an electric field to the liquid crystal layer. In this case, the pixel electrode is formed on the TFT array substrate according to each pixel and the common electrode is integrally formed on the entire surface of the color filter substrate. Accordingly, by changing an arrangement state of liquid crystal molecules of the liquid crystal layer by controlling a voltage applied to the pixel electrode in a state that a voltage is applied to the common electrode, light transmittance of pixels can be individually controlled.

The backlight unit supplies light to the LCD device, which cannot emit light by itself. When light emitted from the backlight unit passes through the liquid crystal layer, light transmittance is determined according to the arrangement state of liquid crystals, and accordingly, an image is displayed.

FIG. 1 is an exploded perspective view showing a general LCD module.

As shown, the LCD device includes a liquid crystal display panel 10 having pixels arranged in a matrix form; a gate driving unit 20 and a data driving unit 30 connected at the sides of the liquid crystal display panel 10; and a backlight unit 40 disposed on a rear surface of the liquid crystal display panel 10.

The liquid crystal display panel 10 includes a TFT array substrate and a color substrate attached so as to face each other with a uniform cell gap maintained therebetween, and a liquid crystal layer formed at the isolated space between the color filter substrate and the TFT array substrate.

A common electrode and a pixel electrode are formed on the liquid crystal display panel formed as the TFT array substrate and the color filter substrate are attached, and apply an electric field to the liquid crystal layer.

When a voltage of a data signal applied to the pixel electrode is controlled in a state that a voltage is applied to the common electrode, liquid crystals of the liquid crystal layer rotate due to dielectric anisotropy according to the electric field between the common electrode and the pixel electrode to transmit or shield light for each pixel to thereby display a character or an image. In order to control a voltage of the data signal applied to the pixel electrode, a switching device such as a TFT is provided at each pixel.

The gate driving unit 20 and the data driving unit 30 are coupled with the liquid crystal display panel 10 in various ways to supply a scan signal and image information to the gate lines and data lines formed on the liquid crystal display panel 10 to drive the pixels of the liquid crystal display panel 10.

The backlight unit 40 includes a light guide plate 41 disposed on a lower surface of the liquid crystal display panel 10, a lamp 42 and a lamp housing 43 disposed at both sides of the light guide plate 41, and a reflection plate 44 disposed on a lower surface of the light guide plate 41. An optical sheet 45 is disposed between the liquid crystal display panel 10 and the light guide plate 41.

As mentioned above, the liquid crystal display panel 10 and the backlight unit 40 are mounted on a main support 50 and an upper edge of the liquid crystal display panel 10 is pressed by a top case 51. The top case 51 is coupled with the main support 50 and a lower cover 22 disposed on the rear surface of the backlight unit 40.

An inverter (not shown) for supplying a drive voltage to the lamp 42 is separately provided to drive the backlight unit 40. The inverter can be provided at one side of the lamp 42 or at both sides of the lamp 42. If the inverter is provided at both sides of the lamp 42, a high voltage is applied to one inverter and a low voltage is applied to the other inverter. The inverters are protected by a metal cover 58 provided at a lower surface of the lower cover 52. The inverters provided at both sides of the lamp are connected by the FFC by circuitry, and the FCC connects both inverters after passing through the lower surface of the lower cover 52.

FIG. 2 illustrates the lower surface of the lower cover. As shown, metal covers 58a and 58b for protecting the inverters are provided at both sides of the lower cover 52, and the FFC 55 connecting the inverter connects a master portion applying a high voltage to one side of the lamp by traversing the lower cover 52 and a slave portion applying a low voltage to the other side of the lamp. In order to fix the FFC 55 to the lower cover 52, a piece of tape 60 is attached on the regions where the FFC 55 passes through. In this case, if the tape 60 is attached on the entire region where the FFC 55 passes through, operability is degraded, so the tape 60 is partially attached at certain intervals. However, portions of the FFC that do not have the tape 60 may become separated (i.e., get loose or bulge away) from the lower cover 52, and since the FFC 55 is exposed, it can be easily damaged.

BRIEF DESCRIPTION

By way of introduction only, a liquid crystal display module is provided that includes a liquid crystal display panel, a lamp, an inverter, a flexible flat cable, a main support, a top case and a lower cover. The lamp supplies light to the liquid crystal display panel. The inverter includes a master portion and a slave portion respectively connected with sides of the lamp and supplies a drive voltage to the lamp. The FFC connects the master and slave portions, thereby permitting feedback therebetween. The liquid crystal display panel and the lamp are mounted on the main support. The top case presses the entire upper edge of the liquid crystal display panel to fix the liquid crystal display panel to the main support. The lower cover is coupled with the top case to support the liquid crystal display panel and the lamp. The lower cover has a mounting part provided at an inner side thereof, on which the FFC is mounted. The mounting part may be a groove. One or more optical sheets may be provided between the liquid crystal display panel and the lamp that enhance efficiency of the light from the lamp supplied to the liquid crystal display panel.

In another embodiment, the liquid crystal display module includes a liquid crystal display panel and a lamp that supplies light to the liquid crystal display panel. In addition, a power supply is connected to the lamp to supply a drive voltage to the lamp. The power supply has a plurality of connected portions that are connected by a power supply line. The liquid crystal display panel and the lamp are mounted on a main support, a top case fixes the liquid crystal display panel to the main support and a lower cover is coupled with the top case to support the liquid crystal display panel, the lamp and a sheet contacting the lower cover. The connected portions are mounted on an outer surface of the lower cover and the power supply line is mounted such that a minority of the power supply line, such as substantially only the ends, is exposed outside the lower cover.

The foregoing brief description is merely a summary of embodiment(s) of the present disclosure and is in no manner intended to limit the scope of the invention recited in the claims. Further aspects of the disclosure will become more apparent from the following detailed description when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure.

In the drawings.

DETAILED DESCRIPTION

An LCD module in accordance with an embodiment will now be described in detail with reference to the accompanying drawings.

Figure 1:
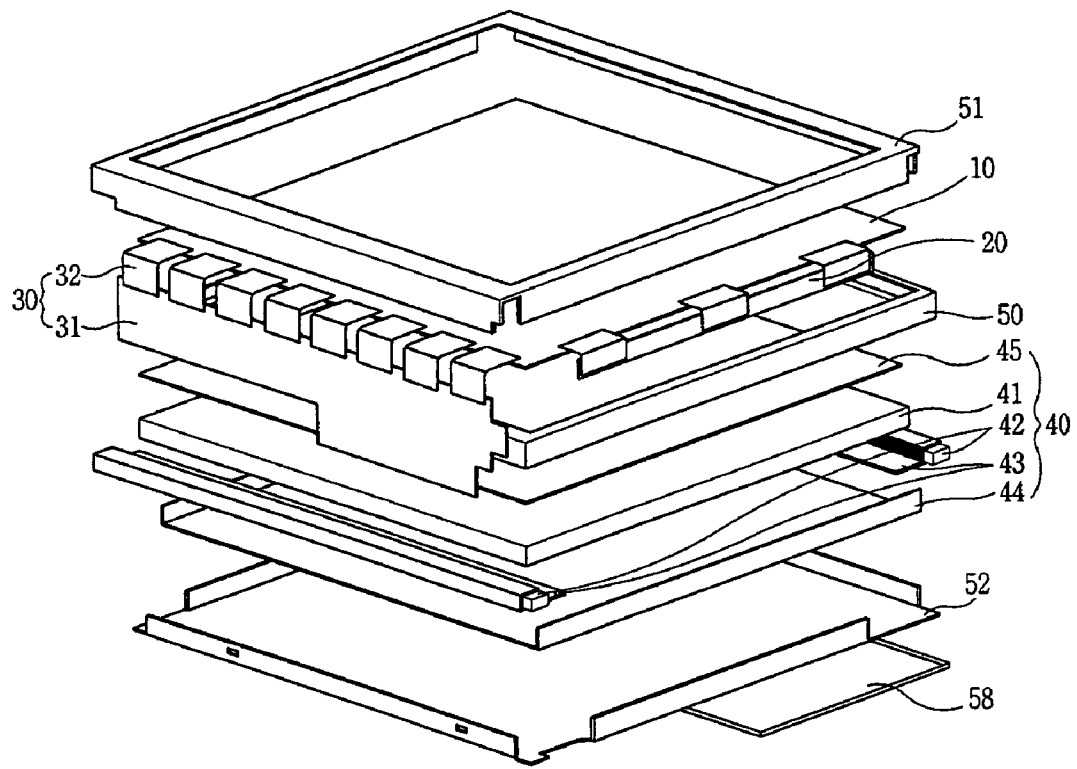
FIG. 1 is an exploded perspective view showing a module of a general liquid crystal display module.
Figure 2:
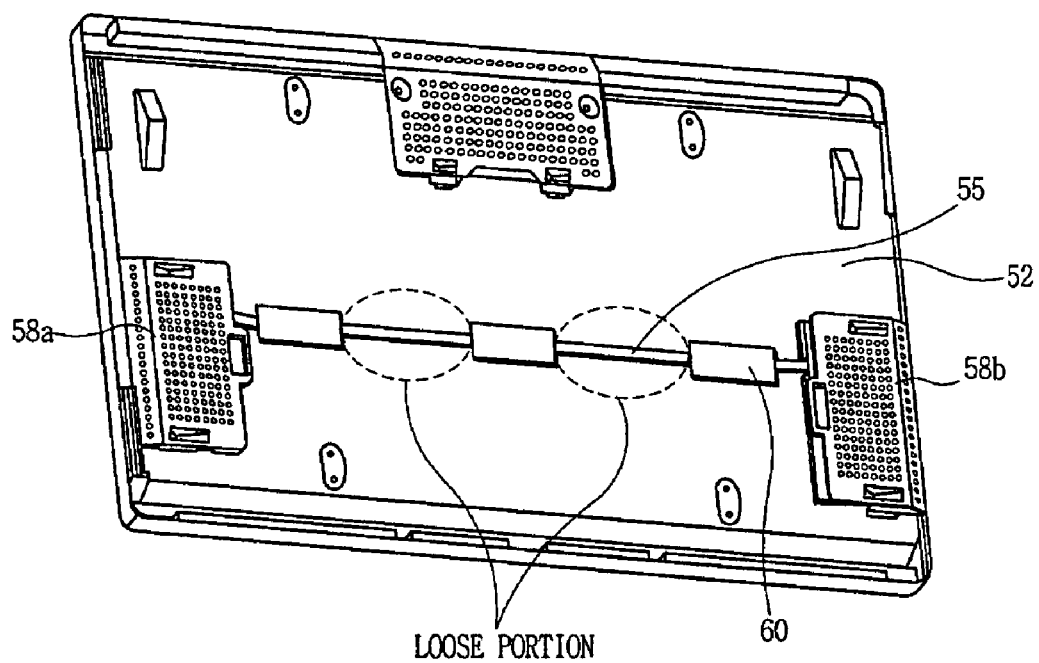
FIG. 2 illustrates a lower surface of a lower cover of the LCD module.
Figure 3:
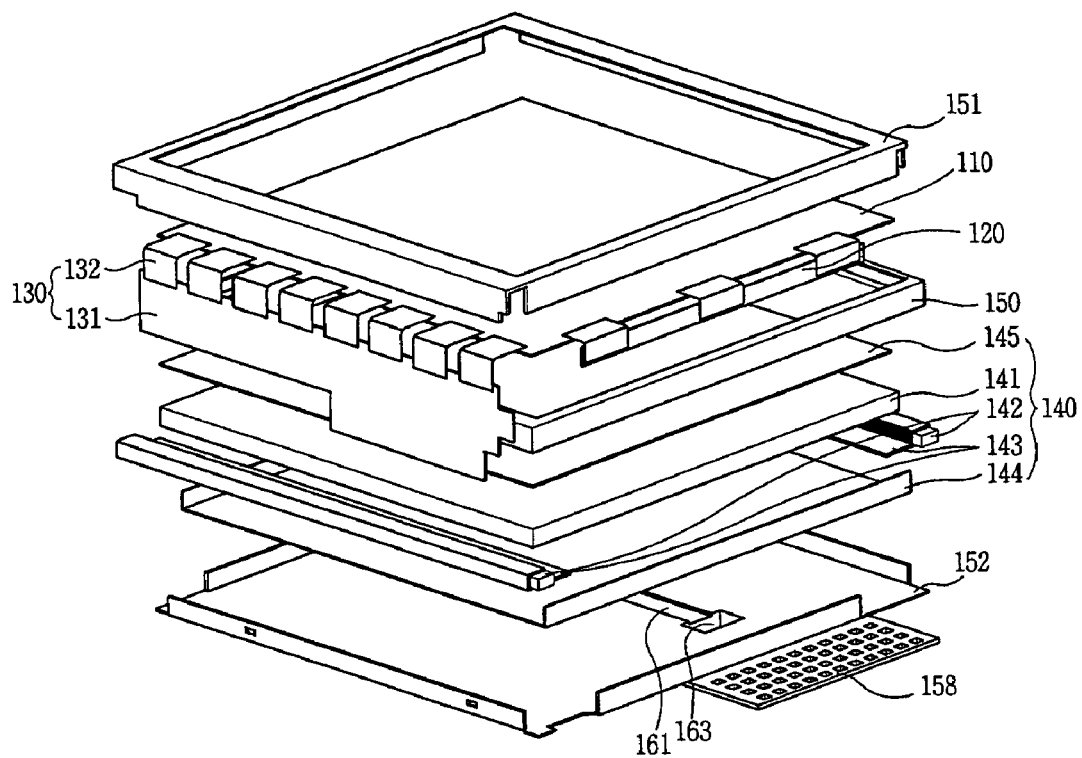
FIG. 3 is an exploded perspective view showing an LCD module in accordance with an embodiment

FIG. 3 is an exploded perspective view showing the LCD module described below. As shown in FIG. 3, the LCD module 100 includes a liquid crystal display panel 110 having pixels arranged in a matrix form; a gate driving unit 120 and a data driving unit 130 connected respectively at the sides of the liquid crystal display panel 110; and a backlight unit 140 disposed at lower surface of the liquid crystal display panel 110.

The liquid crystal display panel 110 includes a TFT array substrate and a color filter substrate attached so as to face each other with a uniform cell gap maintained therebetween, and a liquid crystal layer between the color filter substrate and the TFT array substrate.

A common electrode and a pixel electrode are formed on the liquid crystal display panel by attaching the TFT array substrate and the color filter substrate, and apply an electric field to the liquid crystal layer.

Accordingly, when a voltage applied to the pixel electrode is controlled in a state that a voltage is applied to the common electrode, liquid crystals of the liquid crystal layer rotate due to dielectric anisotropy according to the electric field between the common electrode and the pixel electrode to thereby transmit light therethrough or block light dependent on the pixel to display a character or an image.

The gate driving unit 120 and the data driving unit 130 are coupled with the liquid crystal display panel 110 in various ways to supply a scan signal and image information to the gate lines and data lines formed on the liquid crystal display panel 110 to drive the pixels of the liquid crystal display panel 110.

A backlight unit 140 is formed at the rear surface of the liquid crystal display panel 110 and includes a lamp 142 for generating light and a light guide plate 141 and an optical sheet 145. Light generated by the lamp 142 is made incident toward the side of the light guide plate 141. An inner surface of the lamp housing 143 is processed to reflect light, so that the light generated from the lamp 142 is reflected toward the light guide plate 141, thereby enhancing usage rate of the light generated of the lamp 142.

The light guide plate 141 is made of a plastic transparent material such as PMMA so that it can be formed into a panel with a sloped lower surface and a level upper surface (or a sloped upper surface and a level lower surface). The sloped surface of the light guide plate 141 includes a plurality of dots or V-shaped recesses to uniformly reflect light. Thus, light generated from the lamp 142 can uniformly proceed upwardly by way of the upper surface thereof.

A reflection plate 144 is provided at a lower side of the light guide plate 141, and an optical sheet 145 on which a diffusion plate, a prism sheet and a protection sheet are sequentially stacked is provided at an upper side of the light guide plate 141. The reflection plate 144 reflects light transmitted downwardly through the lower surface of the light guide plate 141 toward the light guide plate 141, thereby reducing the loss of light and enhancing uniformity of the light transmitted upwardly of the light guide plate 141. The light guide plate 141 guides light generated from the lamp 142 in the upward direction together with the reflection plate 144.

The liquid crystal display panel 110 and the backlight unit 140 are mounted on the main support 150, and the edge of the upper surface of the liquid crystal display panel 110 is pressed by the top case 151. The top case 151 is coupled with the main support 150 and the lower cover 152 disposed at the lower surface of the backlight unit 140.

The lamp 142 is connected with the inverter which receives a required drive voltage. The inverter includes various elements for converting DC supplied from outside to AC and increasing AC to a high voltage of a level required for driving the lamp. Thus, if those elements are exposed, various electric accidents such as an electric shock can occur. Accordingly, an insulation cover is attached in order to cover the upper portion of the inverter to insulate it from the outside. The insulation cover is made of a thin non-metal material, so in order to protect various elements attached to the inverter against external physical impact, a metal cover 158 is also provided on the insulation cover. The inverter is disposed at a lower surface of the lower cover, so the metal cover 158 for covering the inverter is also disposed at the lower surface of the lower cover. A plurality of holes for releasing heat generated from the inverter are formed at the metal cover 158.

If the inverter is provided at both sides of the lamp, a first inverter provided at one side of the lamp supplies a high voltage and a second inverter provided at the other side handles a master portion and a slave portion applying a low voltage, respectively. The first and second inverters are connected by a circuit by the FFC so that they can feed back data, and in this case, the FFC passes through the inner surface of the lower cover 152. A mounting part 161 along which the FFC passes is formed at the inner side of the lower cover 152. The mounting part 161 has a groove shape with a certain width and height for accommodating the width and height of the FFC. The groove formed on the lower cover is designed in proportion to the width and height of the FFC.

Figure 4:
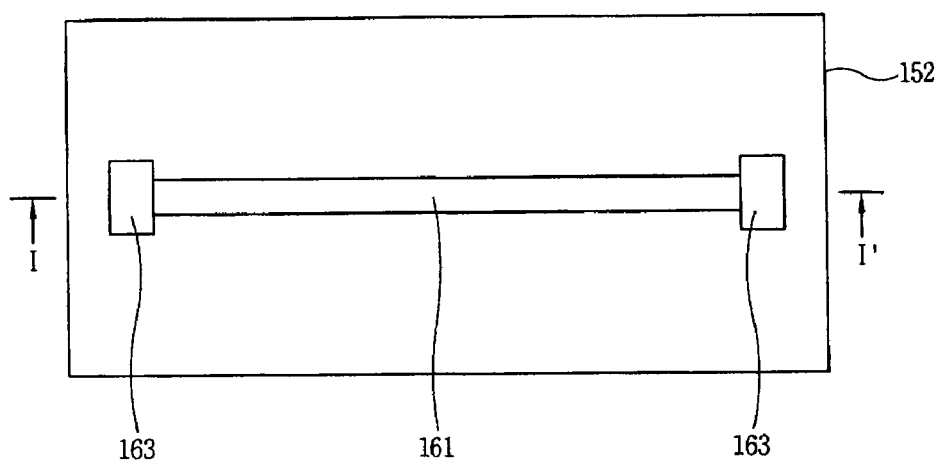
FIG. 4 illustrates an inner side of a lower cover of the LCD module in accordance with the embodiment.

The mounting part of the FFC formed at the inner side of the lower cover will now be described with reference to FIG. 4. As shown in FIG. 4, a groove-shaped mounting part 161 is formed along the path in which the FFC passes, and a through hole 163 is formed at both ends thereof to allow both ends of the FFC to be released externally. The ends of the FFC released through the holes 163 are connected with the inverter disposed at the lower surface of the lower cover 152.

Figure 5:
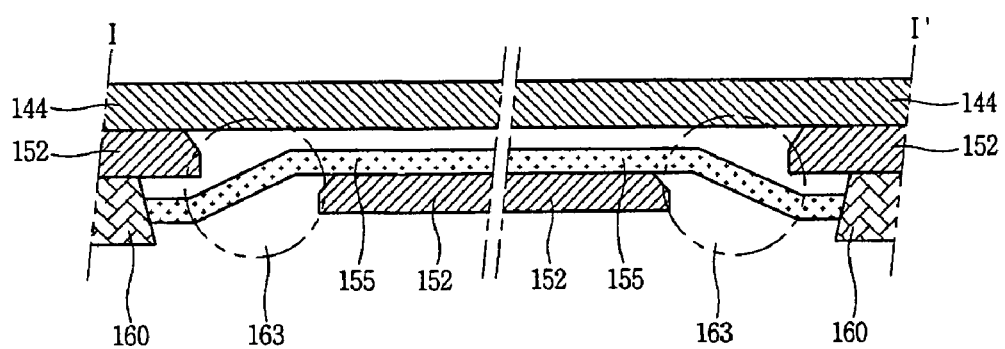
FIG. 5 shows a section taken along line I-I' of FIG. 4.

FIG. 5 shows a section taken along line I-I' of FIG. 4. As shown, the backlight unit 140 includes only a reflection plate 144. The lower cover 152 is disposed at the lower portion of the reflection plate 144. The FFC 155 is connected with the inverters 160 disposed at both lower surfaces of lower cover 152 after passing through the inner side of the lower cover 152. A through hole 163 is formed at both sides of the lower cover 152, through which both side connection parts of the FFC 155 can be exposed.

Figure 6:
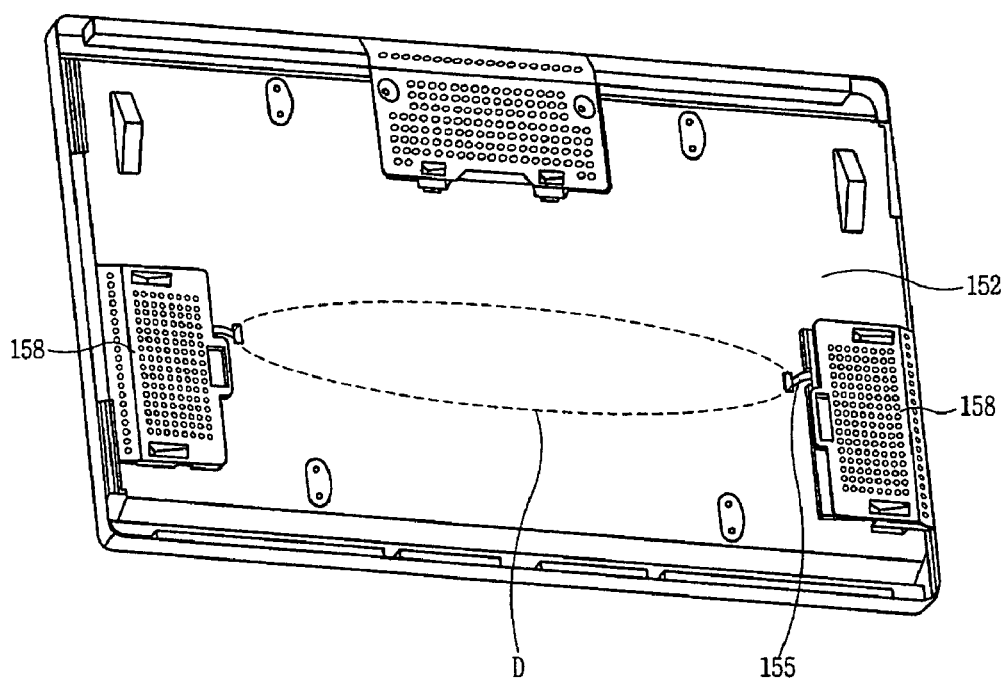
FIG. 6 shows a lower surface of the lower cover of the LCD module in accordance with the present embodiment.

As the FFC 155 passes through the inner side of the lower cover 152, the FFC 155 does not need to be attached with tape so as to be fixed to the lower cover 152. Since the FFC is not exposed, damage or defect to the FFC 155 as it is separated from the lower cover 152 can be prevented and interference with other components can be also prevented. Namely, as shown in FIG. 6, every region of both sides of the lower surface of the lower cover 152, except for the connection part exposed to be connected with the inverters 160, is installed inside the lower cover 152. The region 'D' indicates the region where the FFC 155 passes through inside the lower cover 152.

As mentioned above, according to the LCD module, because the inverters for supplying a high voltage and a low voltage, respectively, are provided at the both sides of the lamp and the groove-shaped mounting part is formed inside the lower cover, along which the FFC for connecting the inverters by circuitry passes, the FFC is prevented from being exposed. Namely, since the FFC does not traverse the lower surface of the lower cover, it is not separated from the lower cover and is not damaged by interference with other peripheral components. This enhances productivity in fabricating the LCD module.

It will be apparent to those skilled in the art that various modifications and variations can be made in the present disclosure without departing from the spirit or scope of the invention as defined by the claims. Thus, it is intended that the present invention cover the modifications and variations of this disclosure provided they come within the scope of the appended claims and their equivalents.

What is claimed is:

1. A liquid crystal display module comprising:
   a liquid crystal display panel;
   a lamp to supply light to the liquid crystal display panel;
   an inverter including a master portion and a slave portion respectively connected with opposing sides of the lamp to supply a drive voltage to the lamp;
   a flexible flat cable (FFC) that connects the master and slave portions to provide signal feedback therebetween;
   a main support on which the liquid crystal display panel and the lamp are mounted;
   a top case that presses an upper edge of the liquid crystal display panel to fix the liquid crystal display panel to the main support; and
   a lower cover coupled with the top case to support the liquid crystal display panel, the lamp and the optical sheet, the lower cover having a mounting part provided at an inner side thereof, on which the FFC is mounted.

2. The module of claim 1, wherein a through hole is formed to expose a connection part of the FFC that connects inverters at both sides of the lower cover.

3. The module of claim 1, wherein the mounting part formed inside the lower cover has a groove shape.

4. The module of claim 3, wherein a width and height of the groove is proportional to a width and height of the FFC.

5. The module of claim 3, wherein through holes are formed at opposite ends of the groove to expose connection parts of the FFC that connect to the master and slave portions disposed adjacent to the through holes.

6. The module of claim 1, further comprising a reflection plate contacting the lower cover excepting the mounting portion of the lower cover.

7. The module of claim 1, further comprising a metal cover that protects the inverter at a lower surface of the lower cover.

8. The module of claim 1, further comprising an optical sheet provided between the liquid crystal display panel and the lamp that enhances efficiency of the light from the lamp supplied to the liquid crystal display panel, the optical sheet mounted on the main support;

9. A liquid crystal display module comprising:
   a liquid crystal display panel;
   a lamp that supplies light to the liquid crystal display panel;
   an inverter that includes a master portion and a slave portion respectively connected with opposing sides of the lamp and supplies a drive voltage to the lamp;
   a flexible flat cable (FFC) that connects the master and the slave portions to provide feedback therebetween;
   an optical sheet provided between the liquid crystal display panel and the lamp that enhances efficiency of the light from the lamp supplied to the liquid crystal display panel;
   a main support on which the liquid crystal display panel, the lamp and the optical sheet are mounted;
   a top case that presses an upper edge of the liquid crystal display panel to fix the liquid crystal display panel to the main support; and a lower cover coupled with the top case to support the liquid crystal display panel, the lamp and the optical sheet, the lower cover having a groove provided at an inner side thereof, along which the FFC passes through.

10. The module of claim 9, wherein a through hole is formed at opposing ends of the groove, through which the connection part of the FFC is exposed.

11. The module of claim 9, further comprising a metal cover provided at a lower surface of the lower cover that protects the inverter.

12. The module of claim 9, wherein a width and height of the groove is proportional to a width and height of the FFC.

13. The module of claim 9, wherein through holes are formed at opposite ends of the groove to expose connection parts of the FFC that connect to the master and slave portions disposed adjacent to the through holes.

14. The module of claim 9, further comprising a reflection plate contacting the lower cover excepting the mounting portion of the lower cover.

15. A liquid crystal display module comprising:
a liquid crystal display panel;
a lamp that supplies light to the liquid crystal display panel;
a power supply connected to the lamp to supply a drive voltage to the lamp, wherein the power supply has a plurality of connected portions;
a power supply line that connects the connected portions;
a main support on which the liquid crystal display panel and the lamp are mounted;
a top case that fixes the liquid crystal display panel to the main support;
a lower cover coupled with the top case to support the liquid crystal display panel, wherein the lower cover supports the lamp and a sheet contacting the lower cover, the connected portions mounted on an outer surface of the lower cover, the power supply line mounted such that both sides of the power supply line are correspondingly exposed outside the lower cover.

16. The module of claim 15, wherein the power supply line is mounted such that substantially one end and the other end of the power supply line are exposed outside the lower cover.

17. The module of claim 15, wherein the lower cover has a guide on an inner surface thereof along the part which the power supply line passes.

18. The module of claim 17, wherein the guide comprises a groove in the lower surface in which a surface of the groove opposing the sheet is not in contact with the sheet.

19. The model of claim 17, wherein a width and height of the guide is proportional to a width and height of the power supply line.

20. The module of claim 17, wherein through holes are formed at ends of the guide to expose connection parts of the power supply line that connect to the portions disposed adjacent to the through holes.

21. The module of claim 15, wherein the sheet comprises a reflection plate that reflects light from the lamp toward the liquid crystal display.

* * * * *

UNITED STATES PATENT AND TRADEMARK OFFICE
CERTIFICATE OF CORRECTION

PATENT NO. : 7,525,609 B2  Page 1 of 1
APPLICATION NO. : 11/302922
DATED : April 28, 2009
INVENTOR(S) : Jong-Kook Lee It is certified that error appears in the above-identified patent and that said Letters Patent is hereby corrected as shown below:

In column 6, claim 8, line 50, immediately after "on the main support" delete ";" and substitute --.-- in its place.

In column 8, claim 19, line 19, before "of claim 17," delete "model" and substitute --module-- in its place.

Signed and Sealed this

Twenty-second Day of September, 2009

David J. Kappos
*Director of the United States Patent and Trademark Office*